United States Patent [19]
Height et al.

[11] 3,987,904
[45] Oct. 26, 1976

[54] STORAGE OF ARTICLES

[76] Inventors: Frank S. Height, 6A W. Hill Road, London, S.W.18; Frank S. Guille, Treasury Oast, Ickham, near Canterbury, Kent, both of England

[22] Filed: Aug. 15, 1974

[21] Appl. No.: 497,715

[52] U.S. Cl. ............................ 211/105.1; 211/123; 248/251
[51] Int. Cl.² .......................................... A47H 1/02
[58] Field of Search .......... 211/105.1, 105.2, 105.3, 211/105.4, 105.5, 123, 124, 183, 184, 172; 285/397, 370; 403/292, 293, 295, 363, 383; 339/20, 21, 22 T; 256/59, 65; 248/251

[56] References Cited
UNITED STATES PATENTS

| | | | |
|---|---|---|---|
| 1,282,959 | 10/1918 | Sears | 285/370 |
| 1,779,730 | 10/1930 | Brunson | 211/123 |
| 2,577,860 | 12/1951 | Schoor | 211/123 |
| 2,680,233 | 6/1954 | McFarlin | 339/21 R |
| 2,762,639 | 9/1956 | Molter et al. | 256/65 |
| 2,905,445 | 9/1959 | Blum | 256/65 |
| 3,239,070 | 3/1966 | Clauson | 211/105.1 |
| 3,282,548 | 11/1966 | Ruhnke | 211/105.1 |
| 3,333,823 | 8/1967 | Genaver et al. | 256/65 |
| 3,398,908 | 8/1968 | Thompson | 211/123 |
| 3,813,071 | 5/1974 | Noryd | 248/251 |

*Primary Examiner*—Robert A. Hafer
*Attorney, Agent, or Firm*—Larson, Taylor and Hinds

[57] ABSTRACT

Components for making a rail, for fixing in a horizontal attitude so as to support articles, including lengths of tube and mounting members, the tube being of uniform cross section with substantially flat front and rear faces which converge slightly towards each other upwards, and each mounting member including a pair of oppositely directed spigots for engaging in the adjacent ends of lengths of tube, and means at the junction of the spigots, by which the member can be fixed to a wall or the like.

1 Claim, 4 Drawing Figures

U.S. Patent
Oct. 26, 1976
3,987,904
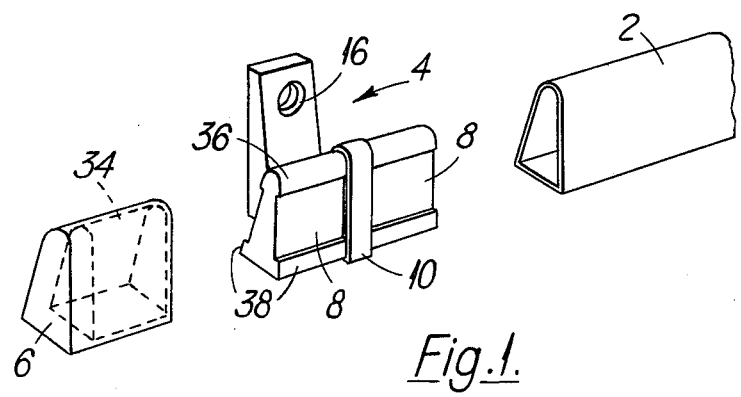
Fig.1.
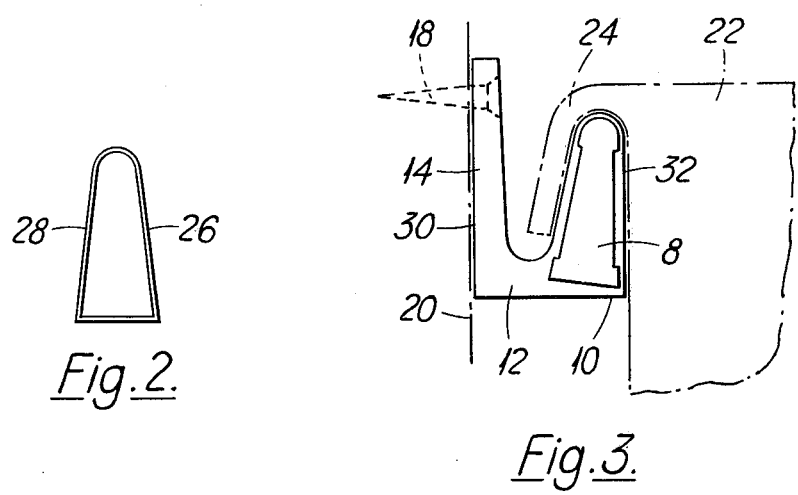
Fig.2.
Fig.3.
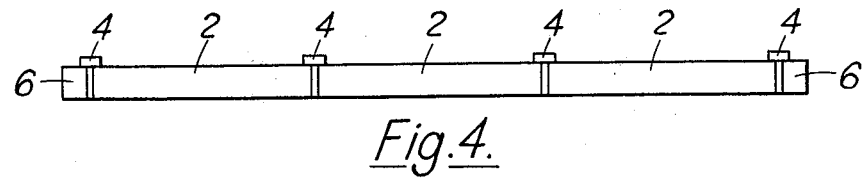
Fig.4.

STORAGE OF ARTICLES

In our British Patent No. 1 223 847 we have described and claimed various aspects of a system for the storage of articles. A system as described in that application consists of:

An article and a rail on which the article can be removably supported, the article having a rear wall, and a tongue, or a plurality of members functionally equivalent to a tongue, extending rearwards and downwards from the rear wall, the rail having a length greater than the width of the article and being capable of being mounted with its length horizontal in an attitude such that it presents a front surface and a rear surface which are vertical or nearly so, and also an upwardly-facing surface, the proportions of the article and the rail being such that the article can be supported by the rail by engaging the tongue over the rail and lowering the article until it rests on the upwardly-facing surface of the rail at at least two places spread apart along the rail, while the opposed surfaces of the rear wall and the tongue make a fit with the front and rear surfaces of the rail, but without wedging, at places which are spread sufficiently to prevent any substantial rotation of the article both about a vertical axis and about an axis parallel to the length of the rail, the opposed surfaces of the rear wall and tongue being shaped to provide diminishing fore-and-aft clearance from the rail as the article is lowered onto the rail.

The present application is concerned with an improved form of rail for use in such a system.

According to the improvement, components for making a rail, for fixing in a horizontal attitude so as to support articles, include lengths of tube and mounting members, the tube being of uniform cross section with substantially flat front and rear faces which converge slightly with each other upwards, and each mounting member including a pair of oppositely directed spigots for engaging in the adjacent ends of lengths of tube, and means at the junction of the spigots, by which the member can be fixed to a wall or the like.

Preferably each spigot has a cross section which is fundamentally a narrow triangle with the smallest angle rounded, with or without recesses in its sides. Mounting members having such spigots are novel in themselves, and are claimed in this application The accompanying drawing shows one example of components according to the present invention, and a rail made from them. In these drawings:

FIG. 1 is a perspective view of some of the components;

FIG. 2 is a cross section of a length of tube;

FIG. 3 is a side elevation of a mounting member; and

FIG. 4 is a front elevation of an assembled rail on a small scale.

FIG. 4 shows that a complete rail consists of a series of lengths of tube 2, alternating with mounting members 4, and terminated at each end by an end cap 6.

As shown in FIG. 1, each mounting member includes a pair of oppositely directed spigots 8, for engaging in the adjacent ends of lengths of tube. The junction between the spigots is constituted by a collar 10, from which extends integrally a bracket having a horizontal limb 12, and a vertical limb 14. In the limb 14 is a hole 16, to receive a fixing screw, by which the bracket can be fixed to a wall or other surface, indicated in FIG. 3 at 20.

As a modification, the mounting member may include extending rearwards from the hole 16, an integral wall plug to enter a hole in a wall and then be expanded by insertion of a screw.

In use, as explained in our British Patent No. 1 223 847, the rail is used to support articles in a manner indicated in FIG. 3. A small part of the body 22 of the article is shown, together with a tongue 24 which extends rearwards and downwards from the body. The tongue rests on the top of the rail, and the tongue and the body fit closely, but without wedging, against flat front and rear faces of the rail.

As shown in FIG. 2, the cross section of the tube is a narrow hollow triangle, with the smallest angle, which forms the top of the rail, considerably rounded. The tube is symmetrical about a plane between the two flat faces 26 and 28, so that in assembly there is no problem about getting a length of tube the right way round. As shown in FIG. 3, the mounting member is so constructed that the tube is slightly tilted, so that the front face of the tube will be parallel to the rear face 30 of the limb 14.

Each spigot 8 is a push fit inside the tube. To permit a good fit, each spigot has a longitudinal recess in each side, so that the contact between the spigot and the respective tube is confined to upper and lower parts 36, 38.

The collar 10 of the mounting member has the same external cross section in its upper part as the tube. This involves the upper part of the collar having a cross section which is larger than the spigots by a uniform amount, which is equal to the wall thickness of the tube. This enables articles to be supported by the rail at any point along its length, either wholly on a tube, or partly on a tube and partly on a mounting member, without any interference between the tongue 24 and the bracket 12, 14, which is in a position which leaves a major upper part of the flat faces of the collar unobstructed.

The rear face 30 is parallel to the flat front, face 32 of the collar.

Each end cap 6 has an external shape similar to the tube, and has a recess 34 in one end, to receive a spigot 8.

The lengths of tube are preferably made of extruded aluminium.

The mounting members and the end caps are preferably made of moulded plastic or impact extruded aluminium.

A kit of parts can be sold to the public with the tube already cut into lengths which are sufficiently short to ensure that a length, mounted between two mounting members 4, cannot be over-loaded by the number of articles which can be placed on it. In other words, the lengths to which the tube is already cut ensure that a rail has a sufficient number of mounting members along it.

It is not essential for the rail to be of symmetrical section.

It is not essential for the mounting members to have brackets for screwing to a wall, as other arrangements may be made for fixing.

We claim:

1. A rail, for fixing in a horizontal attitude so as to support articles having an end wall and a tongue extending rearwardly and downwardly from the end wall, including: lengths of tube and mounting members, the lengths of tube having a continuous circumferential wall and being of uniform cross section with substantially flat front and rear faces which converge upward slightly towards each other and a rounded top, and each mounting member including a pair of oppositely directed spigots for engaging in the adjacent ends of lengths of tube, each spigot having a transverse cross section which is substantially that of an isosceles triangle with the smallest angle rounded, and means, at the junction of the spigots, for aiding in affixing the member to a wall or the like, the junction between the spigots of each mounting member being constituted by a collar having an upper part whose cross section is substantially the same shape as the corresponding part of the spigots, and is larger than the cross section of the corresponding part of the spigots by an uniform amount so that said lengths of tube and said collar form a rail having an uniform upper surface, the front face of said collar being flat and extending substantially parallel to the vertical when the rail is in use, and said affixing means being integral with and extending rearwardly from a lower portion of said collar so that articles can be moved along said rail constituted by said lengths of tube and said mounting members, said rail receiving the tongue of a said article supported thereon such that the rearwardly extending portion of the tongue of the article rests on the upwardly facing surface of the rail, and the rear wall and the tongue make a non-wedging fit with the front and rear faces of the rail.

* * * * *